United States Patent [19]

Taylor et al.

[11] 4,010,331
[45] Mar. 1, 1977

[54] TELEPHONE INTERCOMMUNICATION SYSTEM INCORPORATING IMPROVED DIALING ARRANGEMENT

[75] Inventors: Michael Geoffrey Cleeve Taylor, Teston; Bloomfield James Warman, Wandsworth; Francis Charles Hackett-Jones, near Rochester, all of England

[73] Assignee: GTE International Incorporated, Stamford, Conn.

[22] Filed: Mar. 28, 1975

[21] Appl. No.: 563,044

[30] Foreign Application Priority Data

Apr. 3, 1974 United Kingdom ............. 14879/74

[52] U.S. Cl. ................................ 179/99; 179/90 K
[51] Int. Cl.² ........................................ H04M 1/72
[58] Field of Search ................ 179/90 R, 90 K, 99, 179/1 H

[56] References Cited

UNITED STATES PATENTS

| | | |
|---|---|---|
| 3,856,982 | 12/1974 | Lawson et al. ................. 179/90 K |
| 3,899,638 | 8/1975 | Hahn ............................... 179/90 K |
| 3,931,477 | 1/1976 | Warman ........................... 179/1 H |
| 3,931,479 | 1/1976 | Warman et al. ..................... 179/99 |

OTHER PUBLICATIONS

"Advances in the 1A2 Key Telephone System," S. E. Bush, Bell Labs. Record, vol. 48, No. 9, Oct. 1970, pp. 259, 262 and 263.
"104 Key Telephone System," A. Obata and K. Okuno, Japan Telecommunications Review, vol. 13, No. 3, July 1971, pp. 116–118.

Primary Examiner—William C. Cooper
Assistant Examiner—Randall P. Myers
Attorney, Agent, or Firm—Robert J. Black

[57] ABSTRACT

A telephone intercommunication system where a plurality of stations have access to a plurality of lines. Each station has a pushbutton type keyset which is connectible to integrated circuits associated with each line and are utilized and generate signals for controlling central office switching equipment.

4 Claims, 1 Drawing Figure

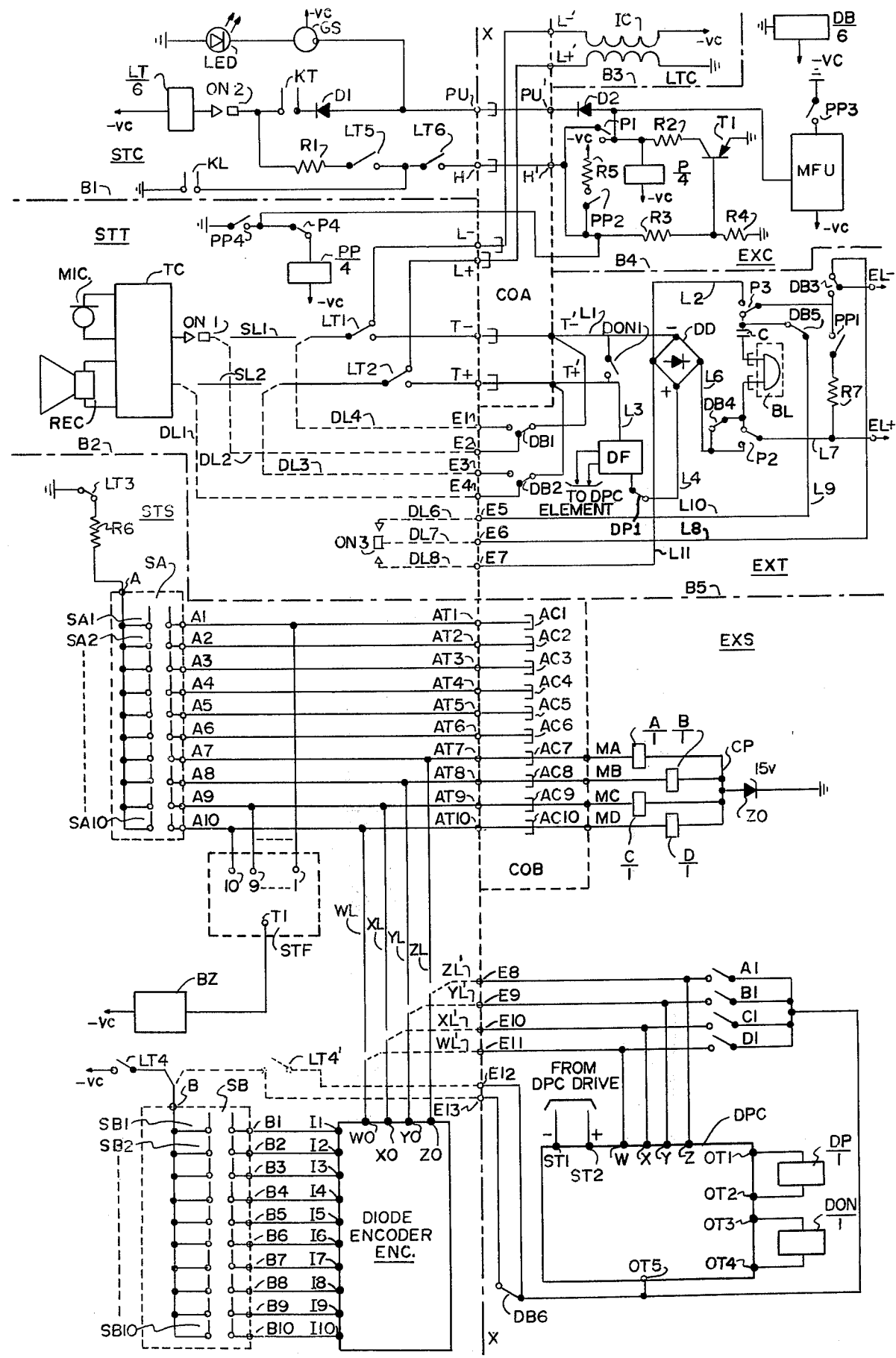

TELEPHONE INTERCOMMUNICATION SYSTEM INCORPORATING IMPROVED DIALING ARRANGEMENT

BACKGROUND OF THE INVENTION

1. Field of the Invention

This invention relates to a telephone intercommunication system incorporating an improved dialing arrangement, and more especially to such a system in which each telephone station of a private intercommunication system may have direct access to one or more external exchange lines and is provided with the facility for direct dialing or keying of external calls.

2. Description of the Prior Art

According to one feature of such telephone intercommunication systems, dialing of either internal extensions within the system itself or of external calls via an exchange line in provided for by a common keypad which is arranged on the one hand to activate a buzzer of an internal extension, and on the other to activate an integrated circuit chip for generating the necessary coded switching signals for out-dialing to an external exchange. Such signals may comprise dial pulses or multi-frequency tone signals, depending on the type of exchange concerned. The alternative functions of the common keypad are selected in accordance with the switched state of the telephone speech circuit, i.e., depending on whether it is connected to an internal speech channel or an external exchange line.

In such previous telephone exchange systems, it has been necessary to incorporate an integrated circuit for generating the coded signals for out-dialing, in each of the extension telephone stations of the system. Such an arrangement involves a duplication of components which renders the system relatively costly.

It is accordingly an object of the present invention to provide a telephone intercommunication system of the type initially referred to, which is of simpler and more economic construction than has hitherto been achieved.

SUMMARY OF THE INVENTION

The present invention provides a telephone intercommunication system comprising, a plurality of extension telephone stations each including line switching means providing individual access to one or more common exchange lines; manually operable means individual to each telephone station for keying digits to set a call; an integrated circuit exclusive to each common exchange line and adapted to generate and apply to said line coded switching signals in response to receipt of corresponding input signals; and means adapted to respond to connection of each telephone station to an exchange line and to place the said manually operable keying means of said station in operative relation with the integrated circuit exclusive to said exchange line, whereby when said keying means is actuated to key a digit a corresponding input signal is applied to said integrated circuit.

Preferably, in order to maintain communication with each exchange line in the event of a failure of the internal power supply of the system, the said integrated circuit associated with each exchange line is arranged to derive its power directly from the exchange line loop, and said system includes means responsive to failure of said internal power supply for connecting the telephone circuit of a single extension telephone station to said exchange line and connecting the keying means of said telephone station in operative relation with the corresponding integrated circuit.

Advantageously the said single extension telephone station is formed as part of a unit including central control means associated with said exchange line, and the keying means of said station are directly connected to the input of said integrated circuit. The keying means of the remaining telephone stations remote from the said unit may be arranged for connection to a relay switching circuit of said unit, which circuit has relay contacts connected to provide input signals to said integrated circuit. This isolates the connecting leads between said keying means and said unit from the input to said integrated circuit, and prevents noise picked up in said leads from interfering with the operation of said integrated circuit.

BRIEF DESCRIPTION OF THE DRAWING

The invention is illustrated by way of example in the accompanying drawing, the single FIGURE of which is a circuit diagram of one embodiment of telephone intercommunication system according to the invention.

DESCRIPTION OF THE PREFERRED EMBODIMENT

Referring to the drawing, in general, the telephone intercommunication system shown provides for up to ten separate extension station calling addresses, at least some of which may be shared, for example on a principal/secretary basis. The system proposed also provides two communication paths, one for external calls and the other for internal calls. The single internal communication path is arranged to provide a non-exclusive conference type communication path to which any extension station of the system can have access at any time and is referred to, hereinafter, as the common talk channel.

The system also incorporates a power supply unit (not shown) which provides a nominal output voltage of 26V, and in the event of a power failure it is arranged that one of the extension stations becomes directly connected to the external exchange line, over which external exchange calls may be made or received. Hereinafter this one extension station is referred to as the "drop-back" station of the system. Also, in the proposed system, the drop-back station is designed, for example to incorporate a plinth unit, so that at least the exchange line circuit apparatus, which terminates the external exchange line, may be accommodated therein.

Referring to the drawing in more detail, the circuit arrangement for an extension station of the system comprises three circuit elements designated STC, STT and STS and is shown to the left of the dashed line X—X, while to the right of this line, the signaling and speech wires which extend between the various extension stations of the system are represented by the commons shown within the compartments COA and COB, the common talk channel speech path current supply source is shown within the compartment LTC, while the exchange line circuit, within which the public exchange line wires EL − and EL + are terminated, is comprised within the circuit element blocks EXC, EXT and EXS.

The circuit arrangement for each of the extension stations, other than the drop-back station, is identical and is represented by the full line connections shown in the drawing. For the drop-back station, with which the exchange line circuit apparatus is incorporated, as previously described, to enable this station to operate in its drop-back mode in the event of a power failure, a number of additional connections are made directly between the drop-back station apparatus and the exchange line circuit apparatus. These connections are indicated by the dotted connecting leads shown in the station circuit and which extend to the exchange line circuit terminals E1-E13.

Each extension station comprises a telephone instrument casing, within which the station apparatus is housed, and an associated microphone and receiver handset. The instrument casing also provides a handset cradle and an associated cradle switch mechanism adapted to actuate cradle switch contacts, indicated at ON1, ON2 and ON3, upon removal and restoration of the handset. In addition, the casing carries a push button key-pad providing at least ten push buttons, numbered 1-0, a light-emitting diode designated LED and two control push buttons, designated KT and KL.

The three circuit elements which comprise an extension station circuit are, a control element STC, a telephone speech transmission and line switching element STT, and a station address and digit signaling element STS. The control element STC is connected over commoned signaling leads which extend between terminals PU, PU' and H, H' to a corresponding control element EXC of the exchange line circuit. The telephone transmission and line switching element STT is connected, for the common talk channel, over commoned line wires which extend between the terminals L −, L −' and L+, L+' to the common supply source LTC, and for the external exchange line channel, over the commoned line wires which extend between the terminals T −, T −' and T +, T +', to the speech transmission element EXT of the exchange line circuit. In addition, and for the drop-back telephone station only, transmission path connections, shown dotted are effected directly to the exchange line circuit terminals E1-E7. The station address and digit signaling element STS is connected over ten commoned address connecting leads, which extend from the terminals AT1-AT10, to the corresponding terminals of each other extension station, of the system of these commoned address connecting leads, the four which extend from the terminals AT-7-AT10 also serve for the transmission of digital codes to the digit sending element EXS of the exchange line circuit and are extended to the respective exchange line circuit terminals MA, MB, MC and MD. Additionally, and for the drop-back station only, digit signaling leads WL', XL', YL' and ZL' shown dotted, extend directly to the exchange line circuit terminals E8-E11.

Considering the circuit arrangements of the system in more detail, the station control element STC includes a switching relay LT, the control push buttons KT and KL and the light-emitting diode LED, the latter being connected between the station earth and the output from a control gate GS which has an inhibiting input applied from the terminal PU and a priming input applied from the negative terminal of the station power supply, hereinafter termed the negative supply. The terminal PU is also connected over a diode D1, normally open push button contacts KT, normally open cradle switch contacts ON2, the winding of the switching relay LT to the negative supply, while the terminal H is connected to the junction between the push button and cradle switch contacts KT and ON2, over a resistor R1 and the normally open contacts LT5 and LT6. Terminal H is also connected to earth over the normally open contacts LT6 of relay LT and the normally open contacts of the push button KL.

The exchange line circuit control element EXC includes a drop-back relay DB, a multivibrator flasher unit MFU, a pick-up relay P, an exchange line holding relay PP and a transistor T1. The drop-back relay DB is connected directly between the station earth and the negative supply and is thereby maintained in its operated condition, the relay releasing only in the event of a power supply failure. The multivibrator MFU serves to apply a flashing stimulus to the light-emitting diodes LED, in each of the station control circuits STC, upon operation of the exchange line holding relay PP, as described later below. The terminal PU' is connected over a diode D2 to the output from the multivibrator MFU, and is also connected over the normally closed "break" contacts of a make-before-break contact set P1 of relay P, to earth, over the winding of relay P and the parallel connected path comprising the resistor R2 and the collector/emitter path of transistor T1. The terminal H' is connected to the normally open moving contact of the contact set P1 and to the junction of three parallel paths, one extending to the negative supply over normally open "make" contacts PP2 of the relay PP and a resistor R5, the second extending to the negative supply over the normally closed "break" contacts of the make-before-break contact set PP4, the normally closed "break" contacts P1 and the winding of relay PP, and the third extending to earth over the resistors R3 and R4. The base of transistor T1 is connected to the junction of the resistors R3 and R4 and in the normal condition of the exchange line control element shown, biasing current for the transistor T1 flows from the supply source via the winding of relay PP, contacts P4 and PP4, both unoperated, the resistors R3 and R4, to earth, neither relay PP nor transistor T1 is affected by the flow of this biasing current, the current level being too low to cause operation of relay PP, and with the circuit normal, no conducting path exists between the transistor collector electrode and the negative supply. Each of the extension station control elements STC is connected to the single exchange line control element EXC over the commoned connecting leads which extend between the terminals PU, PU' and H, H', as previously described thereby enabling the extension station and exchange line control elements to interwork with one another as described below.

In the normal condition of the system, the exchange control unit EXC applies earth, over the winding of relay P, the normally closed make contacts of the contact set P1, the diode D2 the terminal PU' of the exchange line control element, the commoned connecting lead, the terminal PU in each of the extension station control elements, to the inhibiting input to the gate GS therein. These gates are thereby inhibited and the associated light-emitting diode LED is consequently continuously extinguished to indicate that the exchange line is free and available for use.

Should an extension station of the system wish to effect connection to the exchange line circuit, either to make an outgoing, or to answer an incoming, exchange line call, the extension handset is removed and the station control push button KT is operated. As a result a circuit is completed from the negative supply in the station control element STC, the winding of relay LT, operated contacts ON2 and KT, diode D1, terminals PU and PU', the normally closed "break" contacts of contact set P1 to earth over resistor R2 and the collector/emitter path of transistor T1, and the parallel connected winding of relay P. In this circuit, and in consequence of the bias applied to its base electrode from the previously described bias circuit, the transistor T1 conducts, its collector/emitter path including the resistor R2 effectively completing the circuit for the operation of the station control relay LT, and at the same time applying a short circuit to the winding of relay P, thereby preventing any immediate response of this relay. Also, as a result of current flow in the above traced circuit, the potential at the terminal PU in the station control circuit rises towards earth potential and upon operation of relay LT, this potential is applied via the diode D1, operated contacts of the push button KT, resistor R1, operated relay contacts LT5 and LT6, terminals H and H', to the bias resistor R3, in parallel with the battery connected winding of relay PP, in the exchange line circuit control element. In this latter circuit, the value of the resistor R1 in the station control element is chosen to be such that, while there is still no tendency for the relay PP to operate, the potential applied to the base of transistor T1 rises towards earth potential, sufficiently to cause the transistor T1 to cut-off, thus removing the short circuit from relay P, which now operates in series with the station control relay LT. Relay P operating, at contacts P1, disconnects the initial pick-up circuit for relay LT and completes a holding circuit for itself and for relay LT in the station control circuit via the previously traced circuit including terminals H', H, the operated contacts LT5 and LT6 of relay LT and the resistor R1. Disconnection of the initial pick-up circuit also removes the inhibiting input to the gate GS in the station control circuit of each extension station of the system so that these gates open to apply an output stimulus to activate the associated light-emitting diodes LED, which thereby provide a visual indication that the exchange line is engaged. Relay P, at its contacts P4, also disconnects a point in a possible operating path for the relay PP.

At any time during the progress of an exchange line call, a hold condition may be applied to the exchange line by operation of the control push button KL in the extension station concerned. Thus, closure of the push button contacts KL, applies earth potential over operated contacts LT5 and resistor R1 to provide a temporary holding path for relay LT, and over operated contacts LT6, terminals H and H' to the junction of two paths in the exchange control element EXC, one of which extends over the operated contacts P1, to the relay P, which is released by short circuit, while the other extends over the normally closed "break" contacts of contact set PP4, for the operation of relay PP, consequent upon the restoration of the P relay contacts P4. Relay P, restoring, at its contacts P4 completes the operating path for relay PP, and at its contacts P1, disconnects itself from the previously traced holding path and reconnects itself to the pick-up path. Relay PP operating at contact PP2, applies the negative supplied over resistor R5 to the bias circuit for transistor T1, to prepare for the subsequent re-operation of relay P, at contacts PP3 applies earth to cause the multivibrator flasher unit MFU, to operate, and at its contacts PP4 completes a local holding circuit for itself, dependent upon the contact P4 of relay P. Contact PP1 applies a holding condition to the exchange line wires, as described later below. The multi-vibrator unit MFU, operating, applies signal pulses, via the diode D2, the terminal PU', the commoned connecting lead to the terminal PU in each of the station control circuits, and thence to the inhibiting input to the gate GS in each station. The gates GS open and close in response to the applied signal pulses thereby causing the associated light-emitting diodes LED to "flash," to provide an indication at each extension station that a "Hold" condition has been applied to the exchange line. When the push button KL is restored, the temporary holding path for relay LT is disconnected, and relay LT consequently releases. Thus, in the "Hold" condition of the exchange line the control element STC is returned to its normal off-hook condition, except that the light-emitting diode is "Flashing," while in the exchange line control element the pick-up relay and transistor T1 are in this normal condition, the transistor being biased from the resistor R5 as previously described and the relay PP being locked-up dependent upon the contact P4 of relay P.

Any station of the system may now establish, or reestablish connection to the exchange line by operating, or reoperating the control push button KT, to cause sequential operation of relays LT and P in the respective station and exchange line control elements, in the manner previously described. Relay P, operating, at its contact P4, releases relay PP, which at its contact PP3 terminates the operation of the multi-vibrator flasher unit MFU, so that the light-emitting diode in each extension station resumes a steady light-emitting condition to indicate the continued busy condition of the exchange line.

Turning now to the extension station calling and digit signaling element STS of an extension station apparatus and the corresponding digit sending element EXS of the exchange line circuit, the station calling and digit signaling element STS comprises a ten push button keypad (not shown) in which each of the ten push buttons is arranged to actuate a pair of "make" contact switches. These are electrically connected to form two contact sets, designated SA and SB, each set comprising 10 "make" switches, designated SA1–SA10, and SB1–SB10, respectively, with corresponding switches in each set belonging to the same push button operated pair. The 10 "make" switches of each set have their moving contacts commoned together and connected to a respective common supply terminal, while their fixed contacts are connected to respective keypad output terminals. The switch contact set SA has its common supply terminal A connected to earth over a resistor R6 and normally closed contacts LT3 of the control switching relay LT, described above, while the respective keypad output terminals are designated A1–A10. For all extension stations other than the drop-back station, the contact set SB has its common supply terminal B connected to the negative supply over normally open contacts LT4 of the control switching relay LT while for the drop-back station only, as shown by the dotted connecting leads, the terminal B is connected directly to the exchange line circuit terminal E13, and over the contacts LT4 in that station, to the exchange line circuit terminal E12. The respective keypad output terminals are designated B1–B10.

The contact set SA serves for the sending of extension station calling signals, internally of the system and to this end the keypad output terminals A1–A10 are connected to corresponding ones of a group of address terminals, designated 1–10, which form one side of a terminal strapping field STF, the other side of which is constituted by the single terminal TI, which is connected externally of the strapping field to one side of a tone sounding element BZ, the other side of which is connected to the negative supply and which is strapped, internally of the strapping field to the address terminal whose number corresponds to the address number 1–10 of the extension station concerned. The keypad output terminals A1–A10 are also connected respectively to the station terminals AT1–AT10, corresponding ones of which in each extension station of the system are commoned together over connecting leads indicated at AC1–AC10, and of which the four connecting leads AC7–AC10 also extend to respective ones of the terminals MA, MB, MC and MD of the exchange line circuit digit sending element EXS, so that these leads serve the dual purpose of station calling and digit signaling, as later described.

The contact set SB serves for the sending of keyed digital signals to the digit sending element EXS of the exchange line circuit. To this end the keypad output terminals B1–B10 are connected respectively to the inputs I1–I10 of a diode encoding element ENC, which encodes the input decimal digit signals into four element codes which appear from the four encoder output terminals WO, XO, YO and ZO. For all extension stations other than the drop-back station, the station encoder has its output terminals connected respectively to the station terminals AT7–AT10 over connecting leads as indicated at WL, XL, YL and ZL, while for the drop-back station only, the encoder output terminals are connected directly to the exchange line circuit terminals E8, E9, E10 and E11.

The exchange line digit sending element EXS comprises a group of four code signal repeating relays A, B, C and D, and a digit sending element DPC. As previously mentioned, this latter element preferably takes the form of a compact integrated circuit and for the purposes of illustration and explanation, it is assumed that the distant public exchange is one adapted to respond to digital information in the form of trains of impulses such as would be received from an ordinary telephone impulse sending dial. Such integrated circuit digit sending elements for use with push button keypads are well known and are provided with four code signal input terminals W, X, Y and Z, input supply terminals ST1 and ST2 to which a direct current supply is connected and which in the present embodiment is derived from the distant public exchange, over the external exchange line, as described later below, impulse terminals OT1 and OT2 to which an impulse repeating relay DP is connected, impulse train marking terminals OT3 and OT4 to which a relay DON is connected and which is operated for the duration of each impulse train transmitted from the terminals OT1 and OT2, and a signal supply output terminal OT5 to which a signal potential, derived within the integrated circuit, is continuously applied. The single contacts DP1 and DON1 of the relays DP and DON are connected in the line transmission element EXT of the exchange line circuit as described later below. The four code repeating relays A, B, C and D have their windings connected between a common point CP and a respective one of the four exchange line circuit terminals MA, MB, MC and MD, while the common point CP is connected to earth over a 15V zener diode ZD, whose function is also described later below. Each of the code repeating relays has a single "make" contact set as shown at A1, B1, C1 and D1, and these are connected between the common supply terminal OT5 and the code input terminals W, X, Y and Z, so that closure of any combination of these contacts applies a corresponding signal code from the signal supply output terminal to the four code signal input terminals. The code signal input terminals W, X, Y and Z, are also connected directly to the exchange line circuit terminals E8, E9, E10 and E11, while the signal supply terminal OT5 is also connected to the exchange line circuit terminals E12 and E13, the connection to the latter terminal including a "break" contact DB6 of the drop-back relay DB, previously described. It will be recalled that the drop-back relay is maintained operated, except when a power supply failure occurs and consequently the contacts DB6 will be open, so long as the power supply is available.

In operation of the station calling and digit signaling arrangements, while a station of the system is in its normal off-hook condition, that is with the control switching relay LT unoperated, the keypad contact set SA in that station is effective for the sending of internal station calling signals, and any other station of the system may be called by simply operating the keypad push button whose number corresponds to the wanted station number. Thus, upon closure of one of the make contact switches SA1–SA10, a circuit is completed from earth, contact LT3, normal, current limiting resistor R6, the operated one of the "make" contacts SA1–SA10, a respective one of the keypad and station terminals A1–A10 and AT1–AT10, a respective one of the commoned connecting leads AC1–AC10, the respective one of the called station terminals AT1–AT10, the respective one of the terminals 1–10 in the called station strapping field STF, the terminal TI, to be called station tone sounder BZ, which operates to emit an audible calling signal.

Continuing with the operation of the digit signaling arrangements, for the establishment of an exchange line call, operation of the station control switching relay LT, as previously described causes the relay contacts LT3 to open and the contacts LT4 to close, thereby disconnecting the keypad contact set SA and preparing the contact SB for operation. In all extension stations other than the drop-back station, closure of the contacts LT4 applies the negative supply to terminal B of the keypad contact set SB, while in the drop-back extension station closure of the contacts LT4 completes a path between terminal B of the contact set therein and terminal E13 of the exchange line circuit as described above. The digits of the wanted exchange number are keyed in the normal manner, the digital values being encoded by the diode encoder DPC. For stations other than the drop-back station, the digital codes are fed from the encoder output terminals WO, XO, YO and ZO, over the connecting leads WL, XL, YL and ZL, the station terminals AT7 to AT10, the commoned connecting leads AC7 to AC10, the exchange line circuit terminals MA, MB, MC and MD, the code signal repeating relays A, B, C and D to earth over the 15V zener diode ZO. In this circuit respective ones of the code repeating relays operate to apply the code to the digit signal sending element DPC. For the drop-back station only, the digital codes are applied from the encoder output terminals over connecting leads WL′, ZL′, YL′ and ZL′ and the exchange line circuit terminals E8–E11, directly to the digit sending element DPC. The use of the code repeating relays for stations other than the drop-back station enables the commoned connecting leads AC7-AC10, over which spurious signals may be induced, to be isolated from the sensitive electronics of the digit sending element. In the case of the drop-back station, since the exchange line apparatus is incorporated with the station apparatus the respective connecting leads are sufficiently short as not to require isolation. In the event of a power failure causing the control element drop-back relay to restore, terminal B of the keypad contact set SB in the drop-back station becomes directly connected, over the exchange line circuit terminal E13 and the drop-back relay contact DB6 (normal) to the supply output terminal OT5 of the digit sending element DPC, so that digit keying from the drop-back station is effective for the sending of external public exchange directory numbers.

In the station calling and digit sending circuits just described, the resistor R6 is chosen to have a value such that upon closure of any one of the keypad contacts SA7-SA10, to call one of the stations 7-10, the potential applied to the respective exchange line terminals MA-MD does not constitute a short circuit about any of impulse repeating relays A-D therein. Thus, internal station calling and external number sending may proceed from different stations of the system, concurrently, without the digit codes appertaining to the external number being mutilated in any way by the internal station calling signal. The full negative supply which appears at the strapping field terminals 7-10, during keying of these digits does, of course, effectively short circuit the tone sounder element in those of the stations 7-10 which may be emitting a calling signal at the time, but the effect of this is merely to briefly interrupt the calling signal, which is a readily acceptable condition. The 15 volt zener diode in the circuit of the exchange line circuit code repeating relays, effectively isolates the relay earth from the tone sounder elements in stations 7-10, thereby preventing unwanted operation of these elements.

Considering now the arrangements proposed for the speech transmission element STT of an extension station of the system and the arrangement of the corresponding common line supply source LTC and the exchange line circuit transmission element EXC. Each station transmission element STT includes a telephone transmission circuit element TC and an associated microphone MIC and receiver REC, the latter being contained within a telephone handset, as previously described. The transmission element STT also includes line switching contacts LT1 and LT2 of the control switching relay LT, cradle switch contacts ON1 and ON3, and two line wire terminal pairs, the terminals of each pair being designated, respectively, L−, L+, and T− and T+, the former pair being connected to commoned line wires which constitute the common talk channel for internal communication between the stations of the system and the latter being connected to commoned line wires which constitute the exchange line communication channel for external calls. For all extension stations other than the drop-back station, the line wires − and + from the telephone transmission circuit TC extend to the station line wire terminals over the direct connections indicated at SL1 and SL2 the − line wire extending, over the normally open cradle switch contacts ON1 and the normally closed contacts of the change-over contact set LT1 to the L− line wire terminal, and over the normally open contacts of the contact set LT1 to the T− line wire terminal, and the + line wire extending to the L+ and T+ terminals over the respective normally closed and normally open contacts of the change-over contact set LT2. For the drop-back station only, the − line wire is connected over the normally open cradle switch contacts ON1, the dotted line connection DL2 to the exchange line circuit terminal E2, while the moving contact of the change-over contacts LT1 is connected to the exchange line circuit terminal E1 over the dotted line connection DL4. Similarly, the + line wire is connected to the exchange line circuit terminal E4, over the dotted line connection DL1, while the terminal E3 is connected over the dotted line connection DL3 to the moving contact of the contact set LT2. Also for the drop-back station only, the exchange line circuit terminal E6 is connected over the normally open contacts of the cradle switch change-over contact set ON3, and the dotted connecting leads DL7 and DL6 to terminal E5, and over the normally open contacts of the contact set ON3 and the dotted connecting lead DL8 to the terminal E7. The multipled line wires which constitute the common talk channel are connected respectively to the negative supply and to earth over terminals L−′ and L+′ and the speech path induction coil IC in the common channel supply element LTC, while the multipled line wires which constitute the exchange line communication path are connected, respectively, to the terminals T−′ and T+′ in the exchange line circuit transmission element EXT.

Comprised within the exchange line transmission element EXT are a full wave rectifier DD and a direct current filter element DF, the latter being part of, or connected to, the digit sending element DPC and providing a source of direct current to the supply terminals ST1 and ST2 of the digit sending element, without materially affecting the flow of speech currents, therethrough. The element EXT also comprises contacts DB1-DB5 of the control element drop-back relay DB, contacts P2 and P3 of the control element pick-up relay P, contacts PP1 of the control element hold relay PP, contacts DON1 and DP1 of the digit sending element relays DON and DP and a line terminating resistor R7. The moving contact elements of contacts DB1-DB5 are conventionally shown in the positions they occupy when the DB relay is unoperated, that is, when the power supply has failed. Under normal conditions with the power supply available, the DB relay is operated and these contacts occupy their switched positions.

In operation of the station and exchange line circuit speech transmission elements STT and EXT, removal of the handset at any station of the system operates the cradle switch contacts ON1-ON3 therein. Contacts ON1 closing complete the speech path between the telephone circuit TC and the common talk channel, over contacts LT1 and LT2, both normal, and the station line wire terminals L− and L+. As previously described, another station of the system may be called by the continued, or intermittent, operation of the station keypad push button whose number corresponds to the number of the wanted station, until a verbal reply from the called station is received, whereupon conversation may ensue. Any other station may join the conversation, using the common channel in a conference mode, or may request permission to use the common channel, for example to offer an incoming exchange line call to yet another station.

Should a station of the system wish to establish an external exchange line call, then, upon observing that the station light-emitting diode LED is continuously extinguished, indicating that the exchange line is free, the station handset is removed and the control push button KT is operated. As a result, the relay LT in the station control element and the relay P in the exchange line circuit are operated, as previously described. In the station transmission element STT, the contacts LT1 and LT2 extend the station line wires over terminals T— and T+, the commoned line wires and the terminals T—' and T+' to the exchange line circuit transmission element EXT, from where the negative line wire extends over lead L1, the full wave rectifier DD, the lead L2 operated contacts P3 and DB3 to the exchange line terminal EL— while the positive line wire extends over the lead L3 the direct current filter element DF, contact DP1, normal, lead L4, the full wave rectifier DD, lead L6, operated contact P2, and lead L7 to the exchange line terminal EL+. The exchange line circuit terminals T—' and T+' are also connected respectively to the "break" contact side of the change-over contacts DB1 and DB2, but in the power supply available condition assumed, these contacts are operated and serve to apply loop connections between the terminals E1, E2, E3 and E4, so that for the dropback station only, the telephone circuit line wires — and + are extended via these drop-back relay contacts in the exchange line circuit, to the station switching relay contacts LT1 and LT2. As previously described, the calling station may now key the digits of the wanted external subscriber using the station keypad, the impulse trains being repeated by the operation of the line wire looping contacts DON1 and line wire interrupting contacts DP1, in the ordinary way, as well known to those skilled in the art.

For an incoming exchange line call, the exchange line wires EL—, EL+ are connected to the system of calling bells BL, the line wire EL— being connected over contact DB3, operated, contact P3, normal, and a capacitor C, while the line wire EL+ is connected over contact P2, normal. Any station of the system may answer an incoming call by simply removing the station handset and operating the control push button KT, whereupon the answering station is connected through to the exchange line in the same way as described above for an outgoing call.

At any time during the progress of an external exchange line call, outgoing or incoming, the extension station involved may transfer the call to another extension or may make an internal enquiry call while holding the exchange line. For this, as previously described, the station control push button KL is operated, to cause the operation of relay PP and the release of relay P in the exchange line circuit control element EXC, and the release of relay LT, in the station control element STC. In the exchange line circuit transmission element EXT, the release of relay P, at contacts P2 and P3, disconnects the through exchange line speech path, while relay PP operating applies a holding loop to the exchange line wires over contact PP1 and the line terminating resistor R7.

In the event of a power failure preventing normal operation of the system, the drop-back relay DB restores to connect the drop-back station to the exchange line circuit so that this station remains effective to make and receive external exchange line calls. Thus, for incoming calls, the exchange line wires are connected to the calling bells BL, via the EL-line wire, contact DB3, restored, lead L8, terminal E6, the "break" contacts of the cradle switch change-over contact set ON3 and leads DL6 and DL7 in the drop-back station, terminal E5, lead L9, contact DB5, restored, and capacitor C, and via contact P2, normal to the exchange line wire EL+. The drop-back station line wires — and + extend via the cradle switch contacts ON1 in the negative line wire, and over leads DL1 and DL2, the exchange line circuit terminals E2 and E4, the restored contacts DB1 and DB2, to the exchange line circuit terminals T—' and T+'. To answer an incoming, or to make an outgoing, exchange line call, the drop-back station handset is removed, causing the cradle switch contacts to operate. Contacts ON3, changing over, extend the EL— line wire over the "make" contacts of the contact set ON3 and leads DL7 and DL8, in the drop-back station, terminal E7 and lead L10 to the full wave rectifier DD, to the other side of which the exchange line wire EL+ is connected over contacts P2 and DB4 normal. From the full wave rectifier DD, the negative line wire extends to the exchange line circuit T—' while the positive line wire extends to the terminal T+' over the impulsing contacts DP1 and the direct current filter, as previously described.

The telephone intercommunication system described above may readily be adapted to provide for two external exchange lines, with two extension stations of the system arranged to be drop-back stations, each drop-back station accommodating, inter alia, the exchange line circuit apparatus for a respective one of the exchange lines and each being arranged, upon failure of the system power supply, to be directly connected to its respective exchange line, in the manner described above for the single exchange line embodiment. For the establishment of calls over the respective exchange lines, each exchange line circuit would include a digit sending element EXS, the element associated with one exchange line circuit having its terminals MA, MB, MC and MD connected to the multipled connecting leads AC7–AC10 as shown in the attached diagram, while the corresponding terminals of the element associated with the other exchange line circuit, would be connected to the commoned connecting leads AC3–AC6. Also, in each extension station, other than the drop-back stations, the encoder output terminals WO, XO, YO and ZO would be connected over respective changeover switch contacts to respective sets of station terminals AT3–AT6 and AT7–AT10, while for the drop-back station only, the corresponding change-over switch contacts would be connected to switch the encoder outputs in these stations either over the respective connecting leads WL', XL', YL', and ZL' to the associated exchange line circuit terminals E8–E11, or to one or other of the terminal sets AT3–AT6 or AT-7–AT10, depending upon which set corresponds to the exchange line circuit accommodated within the other drop-back station, operation of the change-over switch means in any station being dependent upon the selective operation of control push button switch means for the selection of the particular exchange line to be used for a call.

It will also be appreciated that the single exchange line embodiment described with reference to the attached diagram may be changed in a number of ways without departing from the scope of the invention. For example the station calling and digit sending element STS may be provided with a keypad arranged to operate switch contacts in code formation, there being two sets of coded contacts SA and SB, the codes generated being compatible with the digit sending element DPC provided in the exchange line circuit. With such a keypad, the encoder ENC would no longer be required and would be replaced by a decoding element connected between the strapping field STF and the output from the coded contacts SA.

What we claim is:

1. A telephone system comprising, a plurality of extension telephone stations each including line switching means providing individual access to one or more common exchange lines; manually operable means individual to each telephone station for keying digits to set a call and encoding means connected to said digit keying means operable in response to said keying means to generate coded input signals; pulse generating means exclusive to each common exchange line, comprising an integrated circuit arranged to draw operational power from said associated common exchange line, pulse repeating means connected between said integrated circuit and said exchange line and input signal repeating means connected between said encoding means and said integrated circuit adapted to generate and apply to said line, dial pulses in response to receipt of corresponding input signals; and means adapted to respond to connection of each telephone station to an exchange line and to place the said manually operable keying means of said station in operative relation with the integrated circuit exclusive to said exchange line, whereby when said keying means is actuated to key a digit a corresponding input signal is applied to said integrated circuit.

2. A system as claimed in claim 1, wherein there is further included an internal power supply; and said system includes means responsive to failure of said internal power supply for connecting the telephone circuit of at least a predetermined one of said single extension telephone stations to said exchange line and connecting the keying means and encoding means of said telephone station in operative relation with the corresponding integrated circuit.

3. A system as claimed in claim 2, wherein the said predetermined single extension telephone station encoding means are directly connected to the input of said integrated circuit.

4. A key telephone system including: a common exchange line; a plurality of telephone stations each including, a line key operable to connect said station to said common exchange line, a keyset and encoding means connected to said keyset; a local power source for powering said telephone stations; pulse generating means comprising input signal repeating means, an integrated circuit connected to said input signal repeating means and arranged to draw operational power from said common exchange line and pulse repeating means connected between said integrated circuit and said common exchange line; at least a predetermined one of said telephone stations including circuit connections from said included encoding means to said integrated circuit included in said pulse generating means; all of said telephone stations except said predetermined one(s) including circuit connections from said encoding means to said pulse generating means input signal repeating means; operation of said line key in each of said stations effective to condition said keyset for operation whereby in response to manual operation said keyset is effective to control said encoding means to generate input signals for said pulse generating means and said pulse generating means operated in response to said input signals to generate dial pulses and apply said pulses to said exchange line; and power detection means connected to said local power source, operated in response to failure of said local power source to connect said predetermined telephone station to said exchange line and condition said included keyset for operation.

* * * * *